United States Patent [19]

Scheucher et al.

[11] Patent Number: 5,792,352
[45] Date of Patent: Aug. 11, 1998

[54] DISC FILTER AND FILTER ELEMENTS

[75] Inventors: Peter Scheucher, Kumberg; Josef Muser, Neu-Seiersberg; Wilhelm Korpar, Lieboh; Wolf Sacherer, Graz; Franz Wenzl, Hitzendorf, all of Austria

[73] Assignee: Andritz-Patentverwaltungs-Gesellschaft m.b.H., Graz, Austria

[21] Appl. No.: 524,994

[22] Filed: Sep. 8, 1995

[30] Foreign Application Priority Data

Sep. 8, 1994 [AT] Austria ................. A 1723/94

[51] Int. Cl.⁶ ........................................... B01D 33/21
[52] U.S. Cl. ...................... 210/331; 210/345; 210/346; 210/347; 210/404
[58] Field of Search ................... 210/326, 330, 210/331, 347, 402, 404, 345, 346

[56] References Cited

U.S. PATENT DOCUMENTS

| | | |
|---|---|---|
| 2,932,402 | 4/1960 | Logue et al. |
| 3,591,009 | 7/1971 | Luthi et al. |
| 3,960,729 | 6/1976 | Peterson et al. |
| 4,159,951 | 7/1979 | Davis ................. 210/331 |
| 5,238,564 | 8/1993 | Luthi ................. 210/331 |
| 5,296,152 | 3/1994 | Frykhult ............. 210/327 |

FOREIGN PATENT DOCUMENTS

WO91/04090  4/1991  WIPO

*Primary Examiner*—David A. Reifsnyder
*Attorney, Agent, or Firm*—Alix, Yale & Ristas, LLP

[57] ABSTRACT

A disc filter for separation of liquids from suspensions, in particular fiber stock suspensions, having several filter elements, in particular sector-shaped filter elements, which have a frame and filter areas mounted on both sides, over which a filter medium is mounted, with the filter areas having a lower-lying and higher-lying sections that form area filtrate channels, and having a center core which is provided with core filtrate channels. The filter elements contain collecting channels that receive and collect filtrate flow from the area filtrate channels formed by the lower-lying and higher-lying sections for delivery of the collected filtrate.

24 Claims, 7 Drawing Sheets

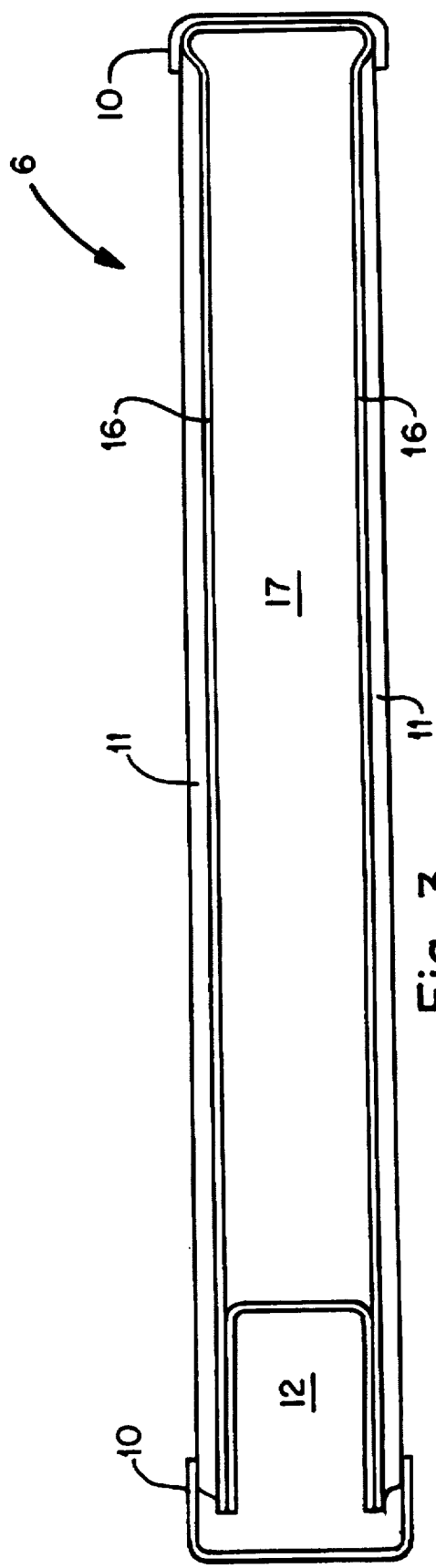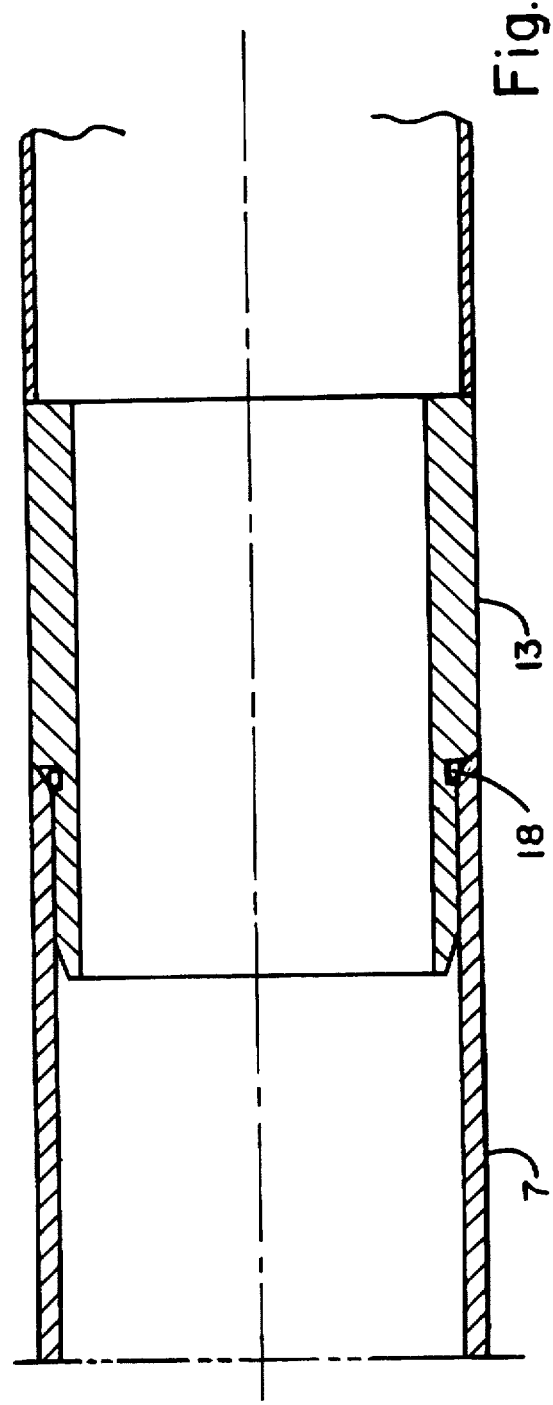

DISC FILTER AND FILTER ELEMENTS

BACKGROUND OF THE INVENTION

The present invention concerns a disc filter for separation of liquids from suspensions, in particular fiber stock suspensions, having several filter elements, in particular sector-shaped filter elements, which have a frame and filter areas mounted on both sides, over which a filter medium is mounted, with the filter areas having lower-lying and higher-lying portions that form channels, and having a center core provided with filtrate channels.

The known disc filters and filter segments of the type described above have a great disadvantage in that the channels formed by the lower-lying and higher-lying sections for evacuation of the filtrate at the of the filter segment form a bottleneck. Also, holes are present at the surface of the filter element for evacuation of the filtrate, whereby the filtrate flow is caused to deflect and thus the filtrate discharge is hampered. This means that the filtrate cannot be sufficiently evacuated and sufficient dehumidification cannot be attained.

SUMMARY OF THE INVENTION

It is the purpose of the present invention to avoid the above disadvantages by a suitable design of the disc filter and the filter elements, especially for dewatering suspensions of relatively low solids content, occurring, in particular, in fiber recovery in the paper industry.

According to the invention, the filter elements contain collecting channels that receive flow from the channels formed by the lower-lying and higher-lying sections, and deliver flow toward the filtrate channels in the core. By arranging a collecting channel on each element, the filtrate is discharged over a larger cross-section so that no filtrate bottlenecks exist.

Preferably, the collecting channels are asymmetrically arranged in the filter element and are partly formed by the frame. With such an arrangement of the collecting channels, the filter element can be designed and manufactured at particularly low cost, while the entire surface of the filter element remains available for filtration.

A favorable design feature of the invention, is that the core has fixed holding devices or guides for the filter elements. As a result of this design feature the filter elements can be easily slid into the holding devices and mounted.

Another favorable design feature of the invention, is that the core has inlet fittings connected to the core filtrate channels, with the discharge fitting of each filter element being connected to an inlet fitting of the core, preferably by coaxial interference fit. This makes safe filtrate discharge in the center core and sealing possible, combined with ease of installation of the filter elements.

A further advantage of the invention, is that the filter areas and the frame form a hollow area, or cavity, which is open at the side of the filter element facing the center core. Through this cavity it is easy to achieve a pressure compensation between the cavity and the surrounding area both in the suspension and in the dry suction area, which means that costly support structures are no longer needed in the cavity of the filter element.

A particularly favorable design feature of the invention is that the cross-section of the collecting channels of the filter elements widens in the direction of the discharge into the core channels. This takes account of the filtrate quantity which increases in the direction of the center core, resulting in unimpeded discharge of the filtrate.

Another favorable design feature of the invention is that the channels of the filter elements formed by the lower-lying and higher-lying sections are inclined toward the center core at an angle $\alpha$ to the radially extending center line of the element, this angle $\alpha$ being between 30° and 90°, preferably about 60°. The filtrate discharge can be favorably influenced by this inclination of the channels toward the core.

A particularly favorable design feature of the invention is that the cross-section of the channels of the filter elements widens in the direction of the collecting channel. This results in lowest overall volumes of the filtrate channels, while the cross-section adapts to the filtrate quantity at the same time.

Another favorable aspect of the invention is that fixing of the filter elements is effected by connection to the neighboring filter element at the filter disc periphery, i.e., outer circumference. This method of connection stabilizes the entire disc filter, and if the filter elements are slid into holding devices it is sufficient to provide only the peripheral connection between elements. This ensures particularly favorable installation features, because fixings have only to be mounted on the filter disc circumference. This is particularly advantageous where filters with a large filter disc diameter are concerned.

A further advantage of the invention is that the filtrate flow cross section narrows at the filtrate discharge from the filter element into the channels of the core. The narrowing of the cross section can be provided at the outlet of the filter element if it directly engages the core filtrate channel. With this narrowing of the cross-section, the flow of the discharge from the filter element is sped up, which results in a more rapid emptying of the filter element. Alternatively, this narrowing can be provided in an inlet fitting to the filtrate channels of the filter core, which receives filtrate flow from the discharge fitting of the element. This arrangement can take into account on one hand, the flow conditions for different stocks that are to be dewatered and, on the other hand, special manufacturing facilities for replacement elements.

A further design feature of the invention is that the narrowing of the cross-section is achieved by means of a baffle plate at the side of the discharge opening at the core channel, for imparting a flow component in the direction of the flow of filtrate in the filter core. The narrowing of the cross-section is alternatively achievable by narrowing the wall of the fitting at the side of the discharge direction of the filtrate in the filter core. Depending on the manufacturing facilities the narrowing of the cross section can be achieved by providing a special shape for the fitting or otherwise by installing a baffle plate, which also makes revamping of the filter elements at a later date possible. If the narrowing of the cross-section is achieved by narrowing the core inlet fitting at the side in the discharge direction of the filtrate in the filter core, standard filter elements can be used.

Another feature of the invention is that at the side opposite to the discharge direction of the filtrate in the filter core, a baffle plate can be provided which optionally protrudes into the core filtrate channel. This helps achieve a particularly favorable deflection and speed-up of the flow.

BRIEF DESCRIPTION OF THE DRAWINGS

The preferred embodiment of the invention is described below with reference to the accompanying drawings, in which

FIG. 3 is a cross-section along line III—III in FIG. 2;

FIG. 4 is a cross-section along line IV—IV in FIG. 2;

DESCRIPTION OF THE PREFERRED EMBODIMENT

Figure 1:
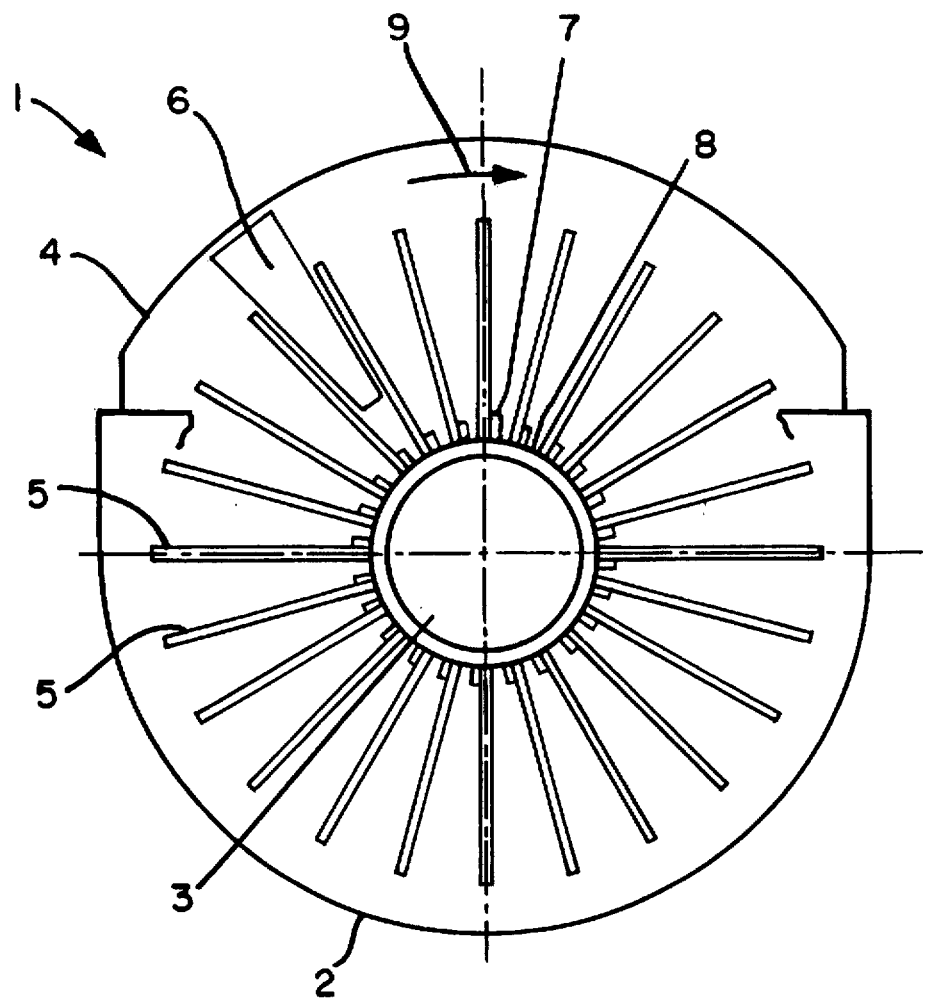
FIG. 1 shows a disc filter according to the invention.
Figure 2:
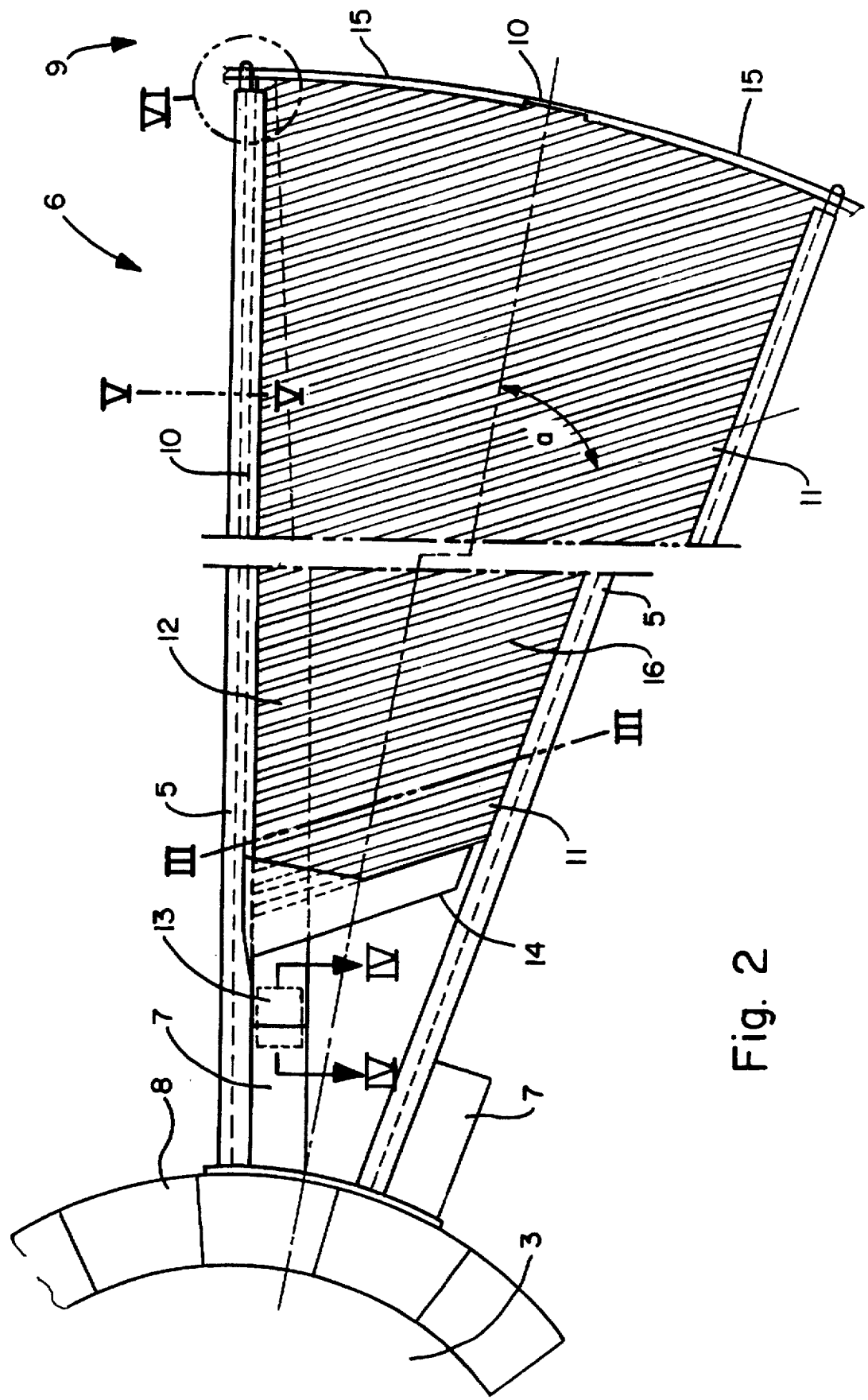
FIG. 2 shows a filter element according to the invention.

FIGS. 1 and 2 show the principal structure of a disc filter 1 in accordance with the invention. The filter comprises a filter vat 2 containing the suspension to be filtered, a substantially tubular filter core 3, and optionally a hood 4. Radially extending holding devices and guides 5 are fixed to the filter core 3. Sector-shaped filter elements 6 are slid radially inward into the guides 5. The filter core 3 has core inlet fittings 7, which are integral with or affixed to the core and lead radially to the core filtrate channels 8, which extend axially through the core. Discharge fittings 13 of the filter elements is slid into these inlet fitting(s) 7. The filter rotates about the axis in the direction of the arrow 9, whereby the discharge fitting 13 of the filter element 6 is the last to emerge from the suspension in vat 2, and prevents the filtrate from flowing backward, away from core 3.

FIGS. 2 and 3 show details of a filter element 6 according to the invention, with the adjoining filter core 3. The filter element 6 comprises a frame 10, to which spaced apart plates 16 are mounted. Each element 6 has frame portions 10 along the leading and trailing edges, and at the radially outer side. The plate areas have lower-lying sections or grooves 11, which serve as plate filtrate channels and lead to an element collecting channel 12 extending radially along the trailing edge of the filter element 6. The cross-section of the element collecting channel 12 widens in the direction of the filter core 3 and leads to element discharge fitting 13, which in turn connects to the core inlet fitting(s) 7 of the filter core.

At the radially inner side 14 of the filter element 6, the cavity 17 formed by the plates 16 is open toward the environs. Through this opening, the suspension in vat 2 can get into the cavity, whereby any pressure forces mutually relieve each other. The same applies by analogy to the section of humidification under hood 4.

The individual filter elements 6 are connected to each other at the outer circumference by holding devices 15. The filter media in the form of a porous bag or the like, is shrunk onto and defines the two outer filtration surfaces of the filter element in the customary manner. The bag is fixed at the lower end which faces the filtrate discharge, using holding plates. These holding plates serve at the same time as covers for the core filtrate channels 8 required for filtrate discharge but which do not serve as dewatering areas, in the foot of the sectors. This favors dewatering by suitable adaption of the disc filter control times.

FIG. 3 shows a section along line III—III in FIG. 2, along a plate filtrate channel 11. The filter element 6 consists of symmetrically arranged plates 16, which have higher and lower-lying areas (i.e., resembling corrugations), and thus form filtrate channels 11. Between plates 16 there is a cavity 17. At one end there is an element collecting channel 12, which is partly formed by the frame 10. Through the inclination of the plate filtrate channels 11 (i.e., transverse to the radial extension of element 6), there is a flow into the collecting channel 12, having a radially inward directed component, which is also in the direction of the flow in element discharge fitting 13, whereby flow diversions and hence flow impediments are prevented.

FIG. 4 shows the mounting of discharge fitting 13 of the filter element 6 in the inlet fitting 7 of the filter core 3. In the transitional section the discharge fitting 13 has a reduced outer diameter, which corresponds to the inner diameter of the inlet fitting 7. A sealing ring 18 is provided at the juncture of fitting 7 with the shoulder in the transition section of fitting 13.

Figure 5:
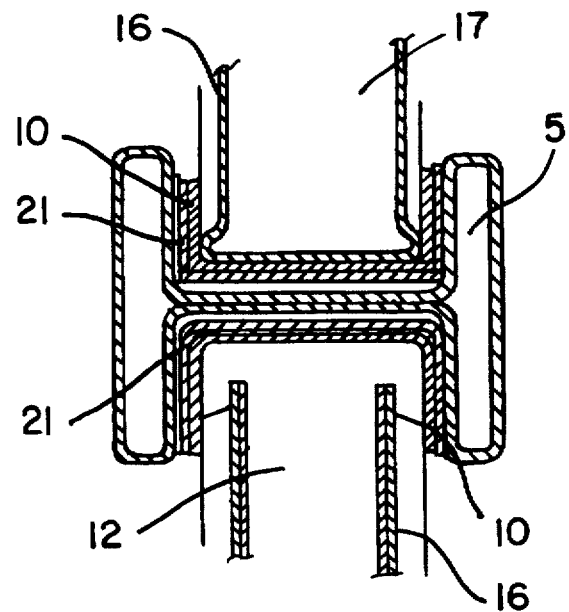
FIG. 5 is a cross-section along line V—V in FIG. 2.
Figure 7:
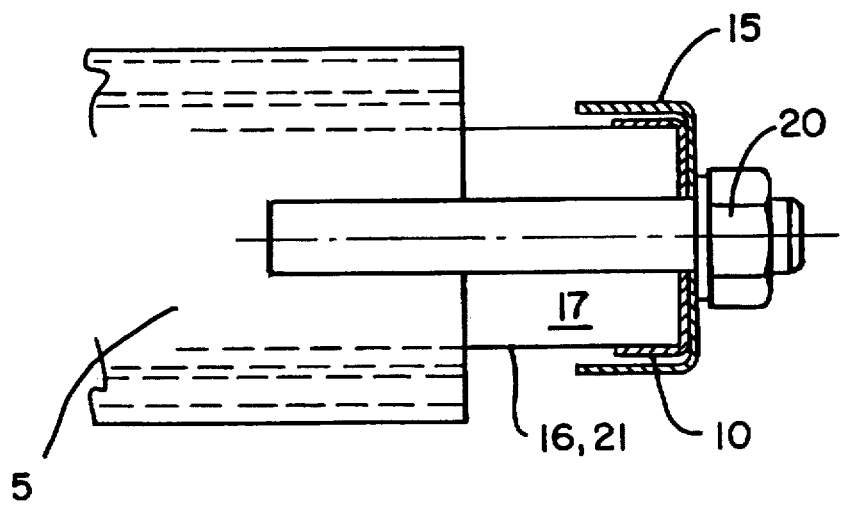
FIG. 7 is a cross-section along line VII—VII in FIG. 2.

FIG. 5 shows a section along line V—V in FIG. 2 and represents the mounting of the filter elements 6 in the holding devices and guides 5. The holding devices 5 are shaped such as to enclose the frames 10 of the filter elements and the filter bags mounted on top, providing safe guidance of the filter elements 6.

Figure 6:
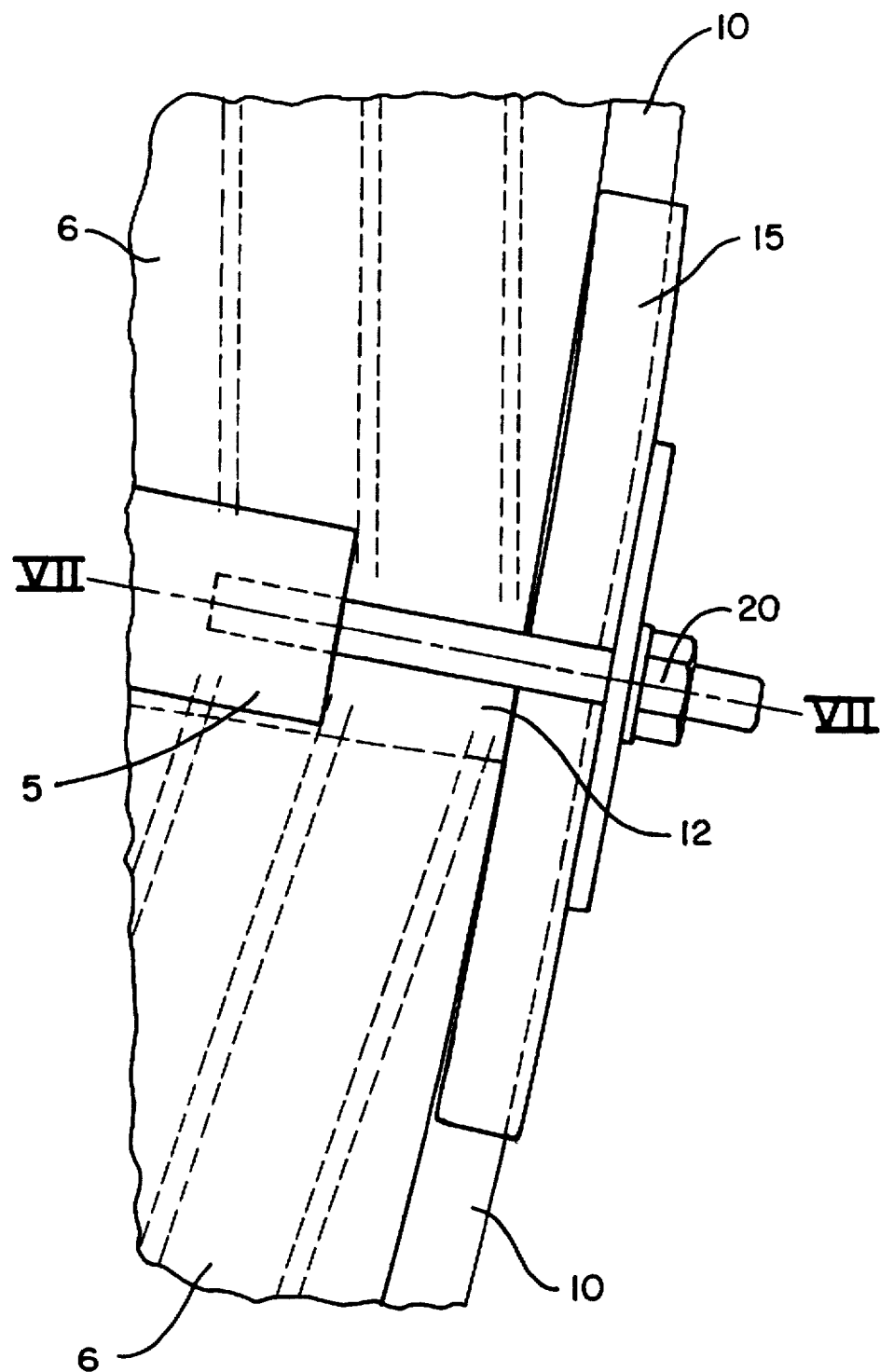
FIG. 6 is a detail at VI from FIG. 2.

FIG. 6 shows a detail VI from FIG. 2, with the connection between two filter elements 6 in this case being effected as shown by segment connections 15 above its frame 10, and above the filter medium, e.g., the filter bag 5. These connections 15 are connected by means of screw 20 in the holding devices 5 at the radially outer side of the filter elements.

Figure 8:
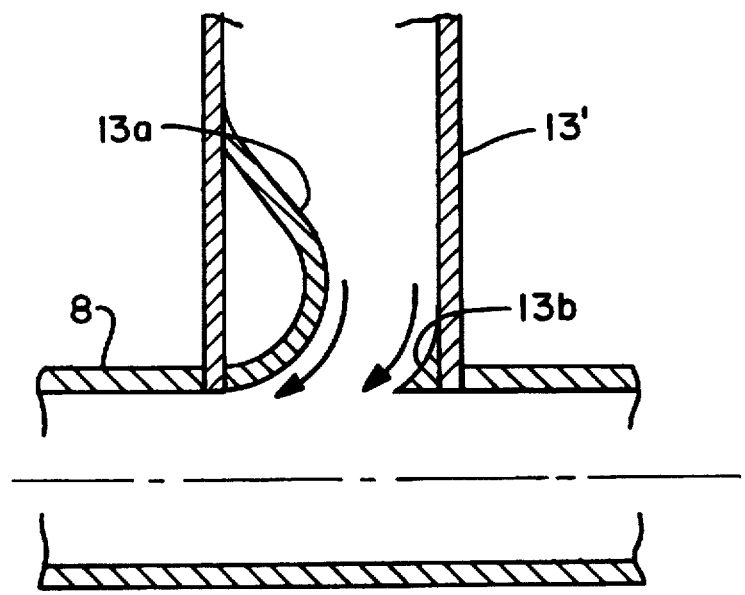
FIG. 8 shows one design of a narrowing flow path of the element discharge fitting in accordance with the invention.

FIG. 8 shows the section through the direct connection of a filter element discharge fitting 13' to the core filtrate channel 8, with the deflection and narrowing of the cross-section being effected by welded deflection plates 13a, 13b ending flush with the edge of the filtrate channel 8.

Figure 9:
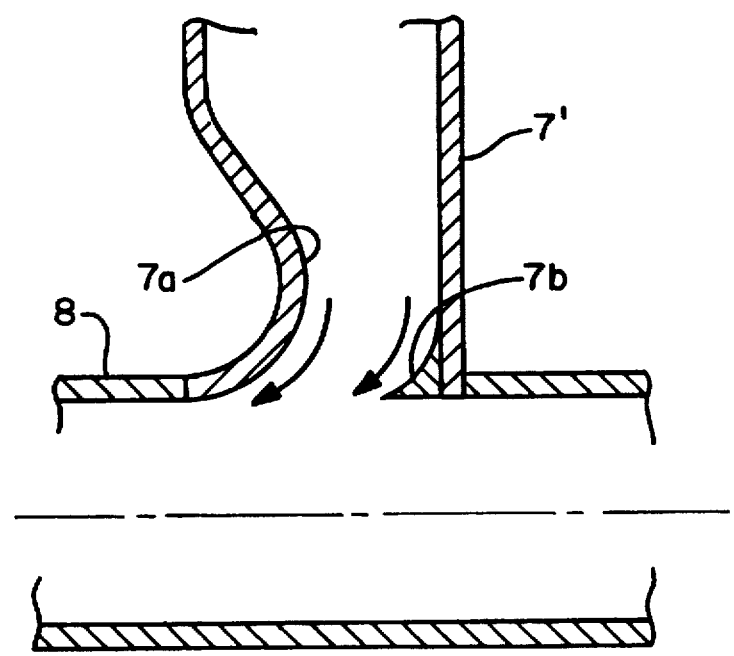
FIG. 9 shows a variant of a narrowing flow path, of the core inlet fitting in accordance with the invention.

FIG. 9 shows an analogous section for the embodiment wherein the filter has an inlet fitting 7' affixed to the core 3. The wall of the core inlet fitting 7' is recessed at 7a, resulting in a narrowing of the flow cross section. The baffle plate 7b is identical to plate 13b of FIG. 8. The region of discharge from the elements 6 to the core channel 8, can be considered a "discharge elbow", whether or not an inlet fitting 7 is present.

Figure 10:
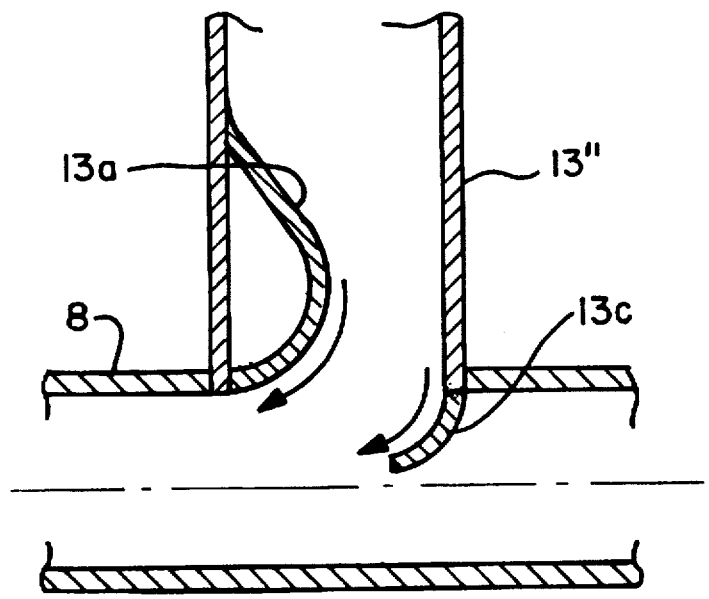
FIGS. 10 and 11 are analogous variants of the invention shown in FIGS. 8 and 9.

FIG. 10 shows an analogous design to FIG. 8 with the exception that the baffle plate 13c of fitting 13" protrudes into the cross section of the core filtrate channel 8.

Figure 11:
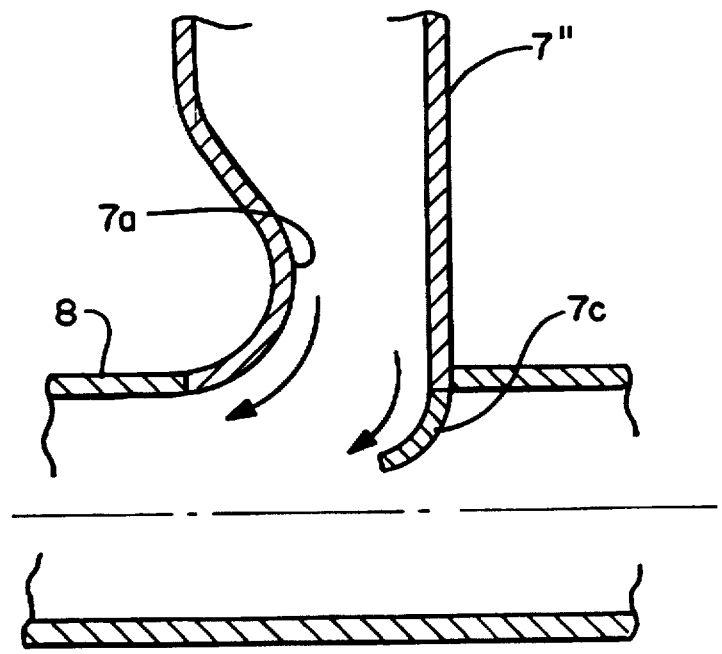

FIG. 11 corresponds to FIG. 9, also with the exception that the baffle plate 7c of fitting 7" protrudes into the cross section of the core filtrate channel 8.

Thus, as shown in FIGS. 8–11, the filter elements have, or cooperate with, means for directing the collected filtrate through a flow cross-section to a discharge opening into the core filtrate channel. The flow cross-section narrows toward the discharge opening. Preferably, the narrowing is achieved by a concave flow surface 13b, 7b, 13c, 7c in opposition to a convex flow surface 13a, 7a formed at the opening of the discharge elbow.

This invention is not limited to the design shapes presented here. It is well possible for the filter elements to be directly fixed to the filter core. In this case, the holding devices and guides are not absolutely necessary. These holding devices and guides can take other shapes than those shown.

We claim:

1. A disc filter rotatable about a filter axis, for separation of liquids from a suspension, having several sector-shaped filter elements, each having a frame and spaced apart filter areas on both axial sides of the element over which a porous filter medium is mountable, with the filter areas having lower-lying and higher-lying portions that form filtrate channels on the surface of the filter areas, and having a central core which is provided with core filtrate channels extending parallel about the filter axis, whereby each filter element of the filter disc is connected to a corresponding filtrate channel in the central core, wherein the improvement comprises that for each sector-shaped filter element the spaced apart filter areas are substantially impervious and each element contains a collecting channel asymmetrically arranged in a radial direction relative to the axis in the space between the filter areas and the frame that is connected to collect filtrate flow from the filtrate channels formed on the surface of the filter element by the lower-lying and higher-lying portions and to deliver the collected flow toward the core filtrate channels, the collecting channel being partially formed by the frame, and filter areas and the frame forming a cavity which opens toward the central core.

2. Disc filter according to claim 1, wherein holding devices are fixed to the core for mounting the filter elements, the holding devices extending in a radial direction relative to the axis.

3. Disc filter according to claim 1, wherein the core has core inlet fittings connected to the core filtrate channels and adapted to receive the filtrate flow from the collecting channels, the core inlet fittings extending in a radial direction relative to the axis.

4. Disc filter according to claim 3, wherein the collecting channels of the filter elements have element discharge fittings that are detachably connected to the inlet fittings of the filter core.

5. Disc filter according to claim 1, wherein the cross section of the collecting channels of the filter elements widens in the direction toward the center core.

6. Disc filter according to claim 1, wherein the filter elements define respective centerlines which extend radially relative to the filter axis and wherein the channels of the filter elements formed by the lower-lying and higher-lying portions are substantially linear over the length thereof and are inclined toward the center core at an angle a to the radially extending centerline of the element.

7. Disc filter according to claim 6, wherein the angle a is between 30° and 90°.

8. Disc filter according to claim 7, wherein the angle a is about 60°.

9. Disc filter according to claim 1, wherein the cross-section of the filtrate channels of the filter elements widens in the direction of the collecting channel.

10. Disc filter according to claims 1, or 2, wherein the filter medium is mounted on the filter elements by a connecting segment which spans portions of adjacent filter elements.

11. Disc filter according to claim 1, wherein means having a narrowing flow cross-section for the collected filtrate are provided between the collecting channel and the core filtrate channel.

12. Disc filter according to claim 11, wherein the narrowing of the cross-section is provided in a discharge fitting of the filter element which forms an elbow with the collecting channel.

13. Disc filter according to claim 11, wherein the narrowing of the cross-section is provided in an inlet fitting which is part of the core and forms an elbow with the collecting channel.

14. Disc filter according to claims 12 or 13, wherein the narrowing of the cross section is achieved by means of at least one baffle plate at the discharge opening of the fitting.

15. Disc filter according to claims 12 or 13, wherein the fitting has a wall and wherein the narrowing of the cross-section is achieved by recessing the wall of the fitting at the discharge opening.

16. Disc filter according to claims 12 or 13, wherein the narrowing of the cross-section imparts a directional flow component which is parallel to the filter axis to the filtrate emerging from the discharge opening.

17. Disc filter according to claim 14, wherein within said filter core channel at the side opposite to the discharge direction of the filtrate a baffle is mounted on the wall of said core filtrate channel.

18. Disc filter according to claim 17, wherein the baffle plate protrudes into the core filtrate channel.

19. A sector-shaped disc filter element comprising: a frame, front and back sides with filter areas on both sides, and inner and outer radial ends, at least one collecting channel asymmetrically arranged and radially extending between the inner and outer radial ends for collecting filtrate from the filter areas and conveying the collected filtrate through a fitting to a discharge opening at said radial inner end, wherein said fitting has a cross-section which narrows at the discharge opening wherein the collecting channel is partially formed by the frame and wherein the filter areas and the frame form a cavity which opens toward the inner radial end.

20. The filter element of claim 19, wherein the narrowing is achieved by a baffle means adjacent the discharge opening, for imparting a lateral flow direction component to the filtrate flow discharged from the discharge opening.

21. The filter element of claim 19, wherein the narrowing is achieved by a recessed wall of said element discharge fitting.

22. The filter element of claim 20 or 21, wherein the narrowing includes a concave flow surface in opposition to a convex flow surface formed at the discharge opening.

23. A disc filter rotatable about the filter axis, for separation of liquids from a suspension, having several sector-shaped filter elements, each having a frame and spaced-apart filter areas on both axial sides of the element over which porous filter medium is mountable, with the filter areas having lower-lying and higher-lying portions that form element filtrate channels on the surface of the filter areas, and having a central core which is provided with core filtrate channels extending parallel to the axis, whereby each filter element of the filter disc is connected to a corresponding filtrate channel in the central core, wherein the improvement comprises that for each sector-shaped filter element the spaced-apart filter areas are substantially impervious and each filter element contains a collecting channel asymmetrically arranged in a radial direction relative to the filter axis in the space between the filter areas and the frame that is connected to collect filtrate flow from the element filtrate channels and to deliver the collected flow toward the core filtrate channels, wherein the filter elements define respective centerlines which extend radially relative to the filter axis and wherein the channels of the filter elements are substantially linear over the length thereof and are inclined toward the central core at an angle a of between about 30° and 90° to the radially extending centerline of the element.

24. A sector-shaped disc filter element comprising:
front and back sides with filter areas having a plurality of linear filtrate channels on both sides, and inner and outer radial ends which define a centerline therebetween, wherein the filtrate channels define an angle a of between 30° and 90° relative to the centerline; and
at least one collecting channel asymmetrically arranged relative to the centerline and extending between the inner and outer radial ends for collecting filtrate from the linear filtrate channels of the filter areas and for conveying the collected filtrate through a fitting to a discharge opening at the inner radial end of the filter element, wherein the fitting has a cross-section which narrows at the discharge opening.

* * * * *